Figure 1:
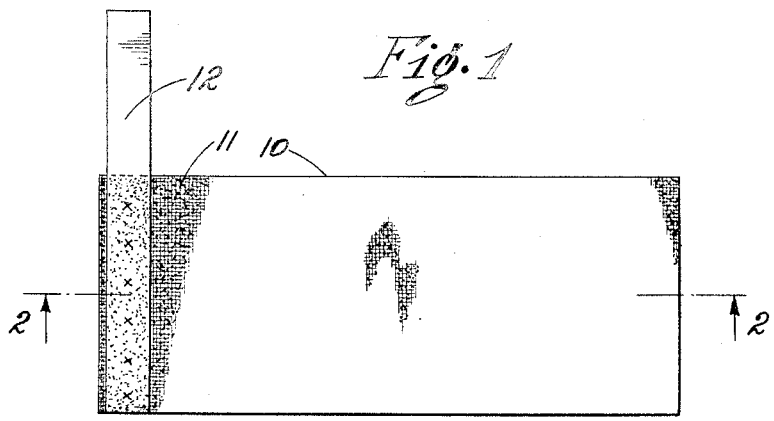

Oct. 31, 1944.   J. B. BRENNAN   2,361,378
ELECTRODE AND METHOD OF MAKING SAME
Filed March 7, 1941

INVENTOR.
JOSEPH B. BRENNAN
BY
ATTORNEYS

Patented Oct. 31, 1944

2,361,378

UNITED STATES PATENT OFFICE 2,361,378

ELECTRODE AND METHOD OF MAKING SAME

Joseph B. Brennan, Euclid, Ohio

Application March 7, 1941, Serial No. 382,206

16 Claims. (Cl. 175—315)

This invention relates to electrodes and methods of making same and more particularly to electrodes for electrolytic devices such as storage batteries especially of the Edison type and electrolytic condensers, rectifiers, lightning arresters and similar devices embodying electrodes of film-forming metal.

In my prior Patent No. 2,104,018, issued January 4, 1938, and in my copending application Serial No. 199,396, filed April 1, 1938, now Patent No. 2,251,913, issued August 12, 1941, I have disclosed electrodes for electrolytic condensers, rectifiers and the like, and electrodes for storage batteries, respectively, which have highly advantageous characteristics because the active surfaces of the electrodes are composed of spray deposited metal giving large capacities per unit of area of the electrode and per unit of mass of metal employed in the electrode. It appears probable that the increase in capacity obtainable with electrodes of this type is due in large part to the porous character of the layers produced by the spraying process which gives a very large metallic area exposed to the action of the electrolyte when the electrode is incorporated in an electrolytic device. The present invention in a sense constitutes an improvement on the inventions disclosed in my aforesaid patent and application in that the electrode and method disclosed herein gives an even greater increase in capacity than that obtainable by my prior inventions, and it is a principal object of the present invention to provide an electrode and method of making same wherein the capacity of electrodes embodying spray deposited active surfaces can be greatly increased both as compared to electrodes of conventional types and as compared to electrodes produced by metal spraying operations such as described in my patent and application aforesaid.

According to my present invention, I increase the capacity of electrodes for electrolytic devices by spraying molten metal upon a suitable base in the general manner described in my prior patent and application aforesaid, and simultaneously with the spraying of the metal I spray or otherwise deposit what I have denominated a filler material, i. e., a non-contaminating material, such as a metallic oxide in very finely divided form, which has the function of creating additional interstices or voids in the sprayed metal structure and which will preferably improve the characteristics of the electrolytic device in the subsequent use of the electrode and at least will not impair such characteristics. I believe that the increase in capacity obtained is due to increased porosity of the deposited metal brought about by the inclusion of the additional material in the sprayed layer.

Figure 2:

In the drawing Fig. 1 is a plan view diagrammatically illustrating an electrode made according to my present invention, and Fig. 2 is a section through the electrode shown in Fig. 1, the thickness of the sprayed material being exaggerated.

As shown in Fig. 1 an electrode made according to my present invention may, for example, comprise a suitable base such as the fabric strip 10 which may consist of one or more layers, having highly porous metallic coatings deposited on both sides thereof. The electrode may be provided with a suitable terminal 12 for connecting the electrode to an external circuit, the terminal being suitably connected to the sprayed surface 11 as by welding and/or sealing with the sprayed material. For the base any suitable materials may be employed, for example, the materials listed in my patent and application aforesaid, various types of gauze and fabrics, open-mesh or closely woven and in one or more thicknesses, wire gauze or perforated or extruded metal. When the base material is a metal, preferably the same metal is used for the base and the spray-deposited layers.

In external appearances, electrodes such that that shown in the drawing and adapted for electrolytic condensers may be similar to the electrode disclosed in my prior application Serial No. 158,105, filed August 9, 1937, now Patent No. 2,280,789, issued April 28, 1942, but by reason of my novel method of spraying the capacity of the electrode per unit of plain area may be increased five to ten times beyond that obtainable by ordinary spraying methods. In producing such an electrode I preferably spray the base material with molten aluminum, for example, by means of a metalizing gun of conventional construction which is provided with means for melting and atomizing an aluminum wire and projecting the atomized metal against the base and simultaneously with the spraying of the aluminum I spray or dust against the base finely divided boric acid powder. The boric acid, for example, may be sprayed by means of a duster embodying a jet of air or it may be shaken onto the base material simultaneously with the metalizing operation through a vibrating screen. The boric acid is preferably discharged at ordinary room temperatures, but if desired it can be heated and, in fact, may be fused and atomized and discharged simultaneously with the metal. Other means of spraying or depositing finely divided boric acid powder simultaneously with the spraying will be apparent to persons skilled in the art, it only being necessary to direct the finely divided material onto the base simultaneously with the spraying operation with the result that the base material is coated with a mixture comprising porous cohering finely divided particles of metallic aluminum which are electrically and mechanically bonded together and finely divided particles of boric acid contained in the interstices or minute pores or spaces between the particles of aluminum. The layer may be only a few thousandths of an inch in thickness, thus insuring flexibility, or if desired, thicker and less flexible layers may be employed, depending upon the type of device for which the electrode is intended.

The finely divided boric acid has the functions of increasing the porosity and hence the effective area of the spray deposited metal and, as it is a film forming material, of improving the efficiency of the film forming operation to which the electrode is subsequently subjected. For example, the sprayed electrode may be subjected to a film forming operation in an aqueous solution of borax and boric acid, the film being formed electrolytically by the conventional method of applying an electromotive force to the electrode as an anode and carrying on the operation until the leakage current has been reduced to the desired low value at the particular voltage specified. In such an operation the presence of the boric acid within the pores of the deposited aluminum assists in the production of the desired dielectric film throughout the sprayed layer and, together with the increased porosity, insures the production of an electrode having an extremely high capacity as well as low leakage and low power factor losses.

If desired aluminum oxide can be employed in place of the boric acid. While the aluminum oxide is not a film forming material, nevertheless the dielectric film which is electroformed on the surfaces of the aluminum particles consists principally of an oxide or hydroxide of aluminum and hence the presence of additional aluminum oxide within the pores of spray deposited surfaces apparently has the effect of improving the characteristics of the surface as well as increasing its porosity and capacity. With other film forming metals other materials may be employed, for example, with titanium, titanium oxide may be sprayed. Also, other film forming materials may be substituted for the boric acid such as, for example, borax. If desired, materials may be employed which merely increase the porosity without contaminating the electrolyte when the electrode is incorporated in a condenser, for example, finely divided glass fibers or textile fibers may be deposited simultaneously with the sprayed metal.

As noted above, it is my opinion that the additional material increases the porosity and hence the effective surface area of the spray deposited layer, however, regardless of the reasons, experiments have demonstrated that by means of my method wherein a material such as those specified above is simultaneously sprayed with a film forming metal, the resulting electrode may be given a capacity as much as fifty times greater than that of a plain foil electrode of the same area and this is accomplished without impairing the electrical characteristics of the electrode. The proportions used may be varied considerably so long as enough of the non-contaminating filler material is used to create the desired additional porosity and so long as the proportion of metal is sufficient to insure that the deposited layer will be conductive and of sufficient mechanical strength to withstand the handling incidental to fabrication and assembly and the shocks and vibrations encountered in service. Substantially equal parts by weight of metal and filling in material will ordinarily give satisfactory results.

In producing an electrode particularly suited for the positive electrode of a nickel or alkaline storage cell substantially the same procedure may be followed, the chief differences being in the materials employed. The base 10 may be of the materials heretofore described, except that if the base is metallic, the metal employed is nickel, and in this instance the layers 11 are composed of nickel. In order to secure the greatly increased capacity by unit of area increasing for the storage battery with the increased condenser capacities mentioned above, I preferably spray the surface with metal by means of a metalizing gun of conventional type as described above and simultaneously with the metal spraying operation I deposit finely divided nickelous hydroxide on the base, the nickelous hydroxide preferably being in the form of a powder which will pass through a 150 mesh screen, and being blown or dusted onto the base as described above in conjunction with the deposition of boric acid.

By this operation the base is coated with a mixture of nickel and nickelous hydroxide, the nickel being in the form of finely divided cohering metallic particles producing a conductive layer while the nickelous hydroxide is held in the interstices, spaces or pores between the particles of metal. Thereafter, in order to prepare the electrode for use in a storage battery, the electrodes may be further impregnated with nickel hydroxide under hydraulic pressure, or may be subjected to a forming operation, for example, by subjecting the electrodes to electrolysis as anodes in a solution composed, for example, of three and one-half parts of potassium ferrocyanide, one part of sodium chloride and one part of sodium hydroxide dissolved in two hundred parts of water at a current density of about one-third ampere per square inch. This provides the nickel particles with a coating of nickelous hydroxide so that they may be used as positive plates in storage cells of the Edison type. In this instance as in the case of the boric acid in the electrolytic condenser electrodes, the nickelous hydroxide increases the porosity of the spray deposited nickel and insures the presence of the active material throughout the porous spray deposited layer. By this means electrodes for storage cells having a greatly enlarged capacity per unit of area and per unit of mass of nickel employed can be produced at very reasonable cost. If desired, the inert filler materials heretofore described may be employed, the principal function of such materials being to increase the porosity, and correspondingly the effective area of the spray deposited layer.

In conjunction with positive electrodes produced as described above, I preferably employ negative electrodes made according to the same general method. In producing such electrodes, I may take a suitable base material 10 such as that described heretofore and on the base simultaneously spray finely divided particles of iron and finely powdered ferric oxide ($Fe_2O_3$) in about equal parts by weight. If a metallic base material is employed, preferably the metal also is substantially pure iron. The spraying operation produces a structure in which the iron particles are in electrical contact with each other, being welded together sufficiently to produce a conductive layer while the ferric oxide powder is held in the interstices, spaces or pores between the metallic particles. To complete the preparation of the electrode for use in the storage battery, electrodes in which the metal and oxide are sprayed on bases of metallic or heat resisting material are preferably subjected to a treatment to reduce a large percentage of the ferric oxide powder contained in the layer. Thus, the electrode having the sprayed layer thereon is placed in a muffle furnace in a hydrogen atmosphere and heated to a temperature of 480° to 500° centigrade. This operation is carried out until the oxide present is largely reduced to finely divided metallic iron, only a few percent of ferric and ferrous oxides remaining in the completed electrode. In some instances it may be desirable to employ mixtures of metals, such as cadmium and iron, for example, which are sprayed simultaneously with the simultaneous spraying of their oxides to produce negative electrodes.

When such electrodes are used in combination with nickel electrodes produced according to my present invention in a conventional alkaline electrolyte, storage cells having very large capacities with relation to their size can be readily produced. The cells are very efficient because of the fact that the minute particles of metal are welded together at their points of contact, and, thus, the resistance of the electrodes is kept at a minimum and the losses within the battery are correspondingly reduced.

In all cases it is preferable to utilize pure materials so that there will be no contamination of the electrodes by the occluded powdered material. For example, the nickelous hydroxide should be purified before use by removing all carbonates and sulphates therefrom.

In the present application I have disclosed my invention as applied to two particular types of electrodes. Those skilled in the art will appreciate that the invention may be applied to electrodes of various other types and to various other electrolytic devices without departing from the spirit and scope of my invention; for example, it is to be specifically noted that the invention is not limited to spraying the metallic and powdered materials onto cloth or woven bases, for other suitable bases such as those described in my aforesaid patent and applications may be employed. Various different techniques in the application of the sprayed metal and powdered material may likewise be utilized without departing from the spirit and scope of my invention. It is therefore to be understood that my invention is not limited to the forms and methods specifically described in the foregoing specification, the description therein being given by way of example rather than by way of limitation, and that my patent is not limited to the preferred forms described herein or in any manner other than by the scope of the appended claims.

I claim:

1. An electrode for an electrolytic device comprising a porous conductive layer of finely divided spray-deposited metal particles mechanically and electrically bonded together and having finely divided particles of a filler material contained in the interstices between said finely divided metal particles prior to immersion of the electrode in an electrolyte, the said filler material comprising a compound of the spray-deposited metal.

2. An electrolytic condenser electrode comprising a porous conductive spray-deposited layer of finely divided cohering particles of film-forming metal having finely divided particles of a film-forming material contained in the interstices between said particles of film-forming metal prior to immersion of the electrode in an electrolyte.

3. An electrode according to claim 2 wherein the film-forming material is boric acid.

4. An electrolytic condenser electrode comprising a porous, conductive spray-deposited layer of finely divided cohering particles of film-forming metal having finely divided particles of an oxide of the same film-forming metal contained in the interstices between said particles of film-forming metal.

5. An electrode comprising a porous, conductive, spray-deposited layer of finely divided cohering particles of nickel having finely divided particles of a filler material contained therein prior to immersion of the electrode in an electrolyte.

6. An electrode according to claim 5 wherein the filler material is nickelous hydroxide.

7. The method of making electrodes for electrolytic devices which includes the steps of spraying finely divided molten metallic particles upon a suitable base, simultaneously depositing finely divided particles of a filler material on the base to provide a porous, conductive layer of the metal having the said finely divided particles of filler material contained therein, and thereafter subjecting the layer to an electrolytic operation in an electrolyte comprising a solution of the said filler material.

8. In the manufacture of electrodes for electrolytic devices, the method which comprises spraying finely divided particles of molten metal upon a suitable base to form a porous conductive layer thereon, and simultaneously depositing a finely divided filler material on the base, whereby the filler material is retained in the spray-deposited layer, and thereafter subjecting the layer to an electrolytic operation.

9. The method according to claim 8, wherein the filler material is a compound of the spray-deposited metal.

10. The method according to claim 8, wherein the spray-deposited layer is a film-forming metal.

11. The method according to claim 8, wherein the spray-deposited layer is a film-forming metal and the filler material is a film-forming material.

12. The method according to claim 8, wherein the spray-deposited metal is aluminum, and the filler material is boric acid.

13. The method according to claim 8, wherein the spray-deposited metal is nickel.

14. The method according to claim 8, wherein the spray-deposited metal is nickel and the filler material is nickelous hydroxide.

15. In combination, an electrolyte and an electrode immersed therein, said electrode comprising a porous conductive mass of finely divided cohering metallic particles, and having finely divided particles of a filler material in addition to the electrolyte contained in the interstices between said metallic particles.

16. In the manufacture of electrodes for electrolytic devices, the method which comprises spraying finely divided particles of molten metal upon a suitable base to form a porous conductive layer thereon, and simultaneously and separately dusting finely divided filler material on the base at substantially room temperature, whereby the filler material is retained in the interstices of the spray deposited layer.

JOSEPH B. BRENNAN.